(12) United States Patent
Bill

(10) Patent No.: US 8,982,977 B2
(45) Date of Patent: Mar. 17, 2015

(54) DISTRIBUTING PERSONALIZED CONTENT

(71) Applicant: David Bill, San Francisco, CA (US)

(72) Inventor: David Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 61 days.

(21) Appl. No.: 13/751,859

(22) Filed: Jan. 28, 2013

(65) Prior Publication Data

US 2013/0138664 A1   May 30, 2013

Related U.S. Application Data

(63) Continuation of application No. 13/225,339, filed on Sep. 2, 2011, now Pat. No. 8,363,636, which is a continuation of application No. 12/852,873, filed on Aug. 9, 2010, which is a continuation of application No. 12/143,381, filed on Jun. 20, 2008, which is a continuation of application No. 09/105,840, filed on Jun. 26, 1998.

(51) Int. Cl.

| | |
|---|---|
| *H04L 12/28* | (2006.01) |
| *H04N 7/10* | (2006.01) |
| *G06F 15/16* | (2006.01) |
| *G06F 17/30* | (2006.01) |
| *G06Q 30/02* | (2012.01) |
| *G06Q 30/06* | (2012.01) |
| *H04L 29/06* | (2006.01) |

(52) U.S. Cl.
CPC .... *G06F 17/30283* (2013.01); *G06F 17/30029* (2013.01); *G06Q 30/0251* (2013.01); *G06Q 30/0601* (2013.01); *G06Q 30/0633* (2013.01); *H04L 65/4076* (2013.01); *H04L 65/602* (2013.01); *Y10S 707/99939* (2013.01)

USPC .......... 375/267; 370/351; 370/400; 709/219; 707/748; 707/999.009

(58) Field of Classification Search
USPC .......... 370/254–338, 351–400; 709/203–217; 707/723–748
See application file for complete search history.

(56) References Cited

U.S. PATENT DOCUMENTS

| | | | |
|---|---|---|---|
| 3,097,720 A | | 7/1963 | Taylor |
| 5,721,827 A | * | 2/1998 | Logan et al. ................. 709/217 |
| 5,920,702 A | | 7/1999 | Bleidt et al. |
| 5,973,722 A | | 10/1999 | Wakai et al. |
| 5,996,014 A | | 11/1999 | Uchihori et al. |
| 6,005,597 A | | 12/1999 | Barrett et al. |
| 6,014,701 A | * | 1/2000 | Chaddha ...................... 709/226 |
| 6,029,195 A | * | 2/2000 | Herz ............................. 725/116 |
| 6,041,239 A | | 3/2000 | Reed et al. |
| 6,097,720 A | | 8/2000 | Araujo et al. |

(Continued)

*Primary Examiner* — Man Phan
(74) *Attorney, Agent, or Firm* — Finnegan, Henderson, Farabow, Garrett & Dunner LLP

(57) ABSTRACT

The invention provides a method and system for distributing personalized content to potentially large numbers of recipients. A pool is selected, from among all content available for distribution, of those content elements that will be made available for simultaneous distribution, and personalized content is selected for distribution from that pool. The content of the pool can change with new selections over time. For each individual recipient, content elements in the pool are examined to determine if they are predicted to be of sufficient interest to that recipient for distribution, and if so, those content elements are distributed. If not, successive content elements in the pool are examined, relaxing the standard for sufficient interest, until at least one content element is found and distributed to the individual recipient.

20 Claims, 2 Drawing Sheets

(56) References Cited

U.S. PATENT DOCUMENTS

| | | |
|---|---|---|
| 6,119,163 A | 9/2000 | Monteiro et al. |
| 6,122,658 A | 9/2000 | Chaddha |
| 6,208,988 B1 | 3/2001 | Schultz |
| 6,253,375 B1 | 6/2001 | Gordon et al. |
| 6,266,649 B1 | 7/2001 | Linden et al. |
| 6,317,722 B1 | 11/2001 | Jacobi et al. |
| 6,345,293 B1 * | 2/2002 | Chaddha .................. 709/219 |
| 6,345,383 B1 | 2/2002 | Ueki |
| 6,460,036 B1 * | 10/2002 | Herz ........................... 707/748 |
| 6,530,083 B1 | 3/2003 | Liebernow |
| 6,687,703 B2 | 2/2004 | Kindo et al. |
| 6,912,505 B2 | 6/2005 | Linden et al. |
| 7,003,519 B1 | 2/2006 | Biettron et al. |
| 7,096,486 B1 | 8/2006 | Ukai et al. |
| 7,113,917 B2 | 9/2006 | Jacobi et al. |
| 7,162,487 B2 | 1/2007 | Kindo et al. |
| 7,162,728 B1 * | 1/2007 | Bahn ........................... 725/36 |
| 7,254,552 B2 | 8/2007 | Bezos et al. |
| 7,308,425 B2 | 12/2007 | Bezos et al. |
| 7,483,871 B2 | 1/2009 | Herz |
| 2003/0014407 A1 * | 1/2003 | Blatter et al. .................. 707/6 |
| 2004/0054572 A1 | 3/2004 | Oldalde et al. |
| 2007/0016922 A1 * | 1/2007 | Koch ........................... 725/35 |
| 2007/0174866 A1 | 7/2007 | Brown et al. |
| 2009/0248682 A1 | 10/2009 | Hueter et al. |

* cited by examiner

DISTRIBUTING PERSONALIZED CONTENT

CROSS-REFERENCE TO RELATED APPLICATION

This application is a continuation of and claims the benefit of priority to U.S. patent application Ser. No. 13/225,339, filed Sep. 2, 2011 (now U.S. Pat. No. 8,363,636), which is a continuation of U.S. patent application Ser. No. 12/852,873, filed on Aug. 8, 2010 (now U.S. Pat. No. 8,014,407), which is a continuation of U.S. patent application Ser. No. 12/143,381, filed Jun. 20, 2008 (now U.S. Pat. No. 7,778,268), which is a continuation of U.S. patent application Ser. No. 09/105,840, filed Jun. 26, 1998 (now U.S. Pat. No. 7,394,816). The contents of the above-referenced applications are expressly incorporated herein by reference to their entireties.

BACKGROUND OF THE INVENTION

1. Field of the Invention

This invention relates to distributing personalized content.

2. Related Art

Known distribution systems for content include broadcast systems, such as broadcast radio and broadcast television, and personalized systems, such as direct purchases of records and videotapes. Recent developments in content distribution include digital storage of content and digital distribution of content, including both audio and video. For example, it is now possible to store popular songs on disk and distribute those songs to recipients using a communication network.

One problem in the known art is that distributing personalized information greatly increases the bandwidth used for distribution. At any one moment, each individual recipient can have different desires for content, so a large number of recipients can use substantial amounts of distribution bandwidth. Distribution bandwidth includes both the communication infrastructure to transmit that content to recipients, as well as the infrastructure to retrieve that content from storage and present that content to the communication infrastructure. For example, while it can be relatively easy to store several thousand songs on magnetic media, it is still relatively difficult to retrieve more than a few dozen of those songs from magnetic media simultaneously.

Accordingly, it would be desirable to distribute personalized content to potentially large numbers of recipients, without incurring the problems of the known art. This advantage is achieved in an embodiment of the invention in which a pool is selected, from among all content available for distribution, of those content elements that will be made available for simultaneous distribution, and personalized content is selected for distribution from that pool.

SUMMARY OF THE INVENTION

The invention provides a method and system for distributing personalized content to potentially large numbers of recipients. A pool is selected, from among all content available for distribution, of those content elements that will be made available for simultaneous distribution, and personalized content is selected for distribution from that pool. The content of the pool can change with new selections over time. For each individual recipient, content elements in the pool are examined to determine if they are predicted to be of sufficient interest to that recipient for distribution, and if so, those content elements are distributed. If not, successive content elements in the pool are examined, relaxing the standard for sufficient interest, until at least one content element is found and distributed to the individual recipient.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general or special purpose processors under program control, or other circuits, adapted to particular process steps and data structures described herein, and that implementation of the process steps and data structures described herein would not require undue experimentation or further invention.

System Elements

Figure 1:
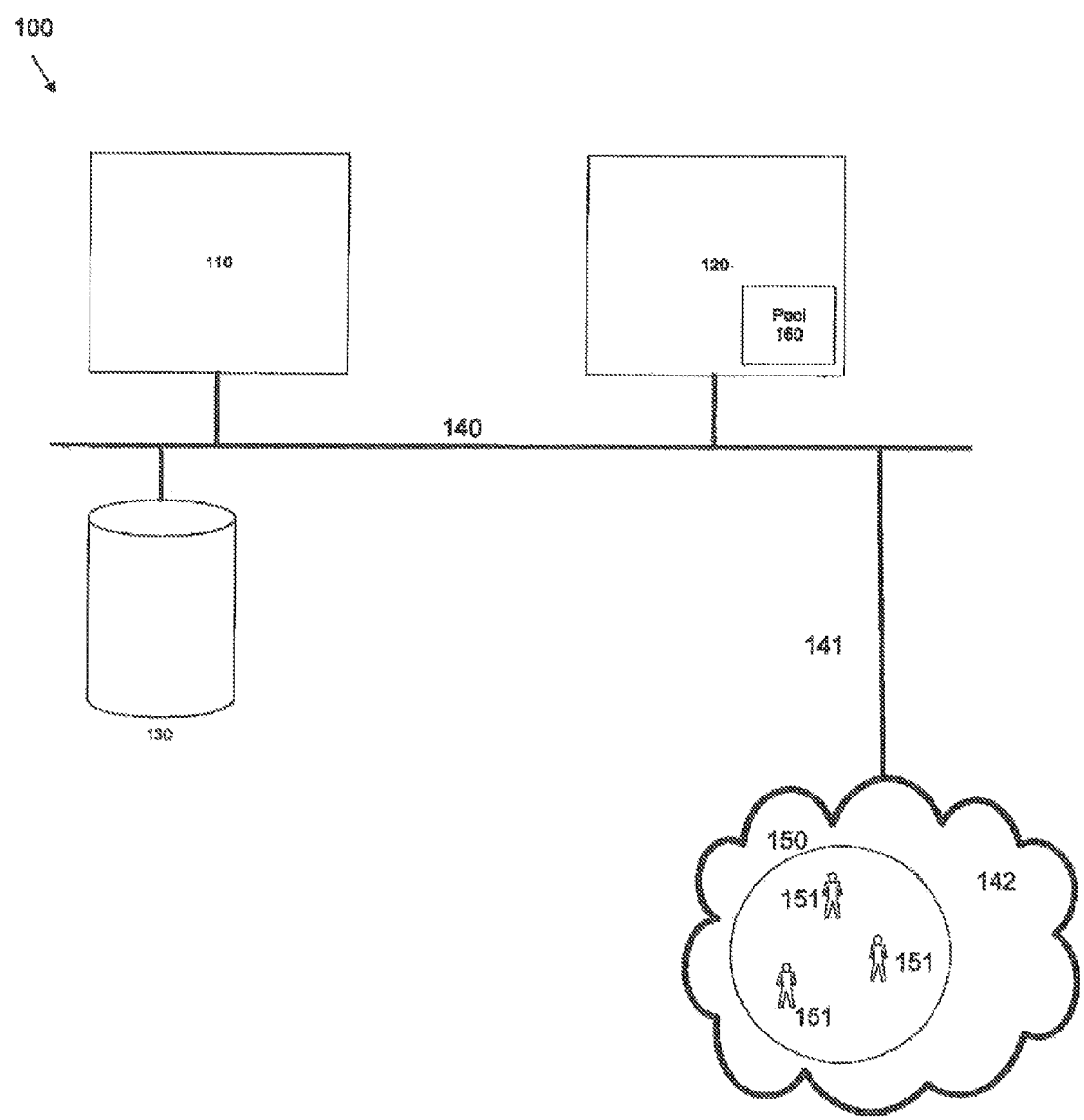
FIG. 1 shows a diagram of a system for distributing personalized content.

FIG. 1 shows a diagram of a system for distributing personalized content.

A system 100 for distributing personalized content includes a processor 110, program and data memory 120, mass storage 130, and a communication path 140 to a community 150 of individual recipients.

The processor 110 and memory 120 include any one of a set of known processors, operating under control of operating system and application programs in the memory 120. The mass storage 130 includes magnetic, optical, or magneto-optical storage suitable for maintains large amounts of data and delivering segments of that data to the memory 120 upon instruction by the processor 110.

The mass storage 130 maintains a relatively large number of content elements. In a preferred embodiment, each content element comprises an audio song in a digital format, such as an AU format, a WAV format, (preferably) a "Real Audio" or "Real Player" format, or another known format. Storage and delivery of these digital formats are known in the art. For example, in a preferred embodiment, the mass storage 130 maintains about 80,000 songs.

The invention is described herein with primary regard to delivery of audio songs in a digital format. However, the invention has wide applicability to delivery of other content elements, including other types of data and other types of format. For example, the invention is applicable to delivery of music videos, other audiovisual or video elements, graphic elements, mapping information, seismic information, telemetry information, or other known data in is addition to or in combination therewith.

Network Distribution

The communication path 140 includes a communication link 141 (such as a T1 connection or a similar link) to a communication network 142 (such as the internet or a similar network). The communication link 141 is disposed for transmitting data from the memory 120 at a rate sufficient to deliver each content element to the community 150 of individual recipients, so that each individual recipient 151 in the community 150 receives content elements substantially in real time.

The communication network 142 is disposed for transmitting data from the communication link 141 to each individual recipient 151 in the community 150 at a rate as sufficient to deliver each content element to each individual recipient 151 in the community 150 substantially in real time.

In alternative embodiments, the communication network 142 may be disposed for transmitting data to sets of individual recipients 151 in the community 150 using a multicast distribution technique, such as IP multicast.

Each content element maintained on the mass storage 130 is assigned to one or more channels for distribution.

In a preferred embodiment, each channel includes a recognizable genre or subdivision of known music, such as for example "Big Bands," "Classical," "Country & Western," "Heavy Metal," "Love Songs," "1950s," and the like. For example, in a preferred embodiment, each song maintained on the mass storage 130 is assigned to one or more of about 100 or so channels. Channels can, but need not, be assigned numeric or alphanumeric identifiers.

Each channel comprises content elements that are thought to appeal to substantially the same set of individual recipients 151 in the community 150.

For example, content elements are assigned to the channel "Country & Western" because it is believed that they will all have appeal to a group of individual recipients 151 in the community 150 who like "Country & Western" songs.

However, within each particular channel, those individual recipients 151 who receive content elements from that particular channel often have differing likes and dislikes. For each particular channel, the content elements on that channel do not necessarily have the same appeal to each individual recipient 151 receiving content elements from that channel.

Distribution Pool

For each particular channel, the system 100 maintains a pool 160 in the memory 120 of selected content elements assigned to that channel.

Those content elements selected for the pool 160 are maintained in the memory 120 to be distributed to individual recipients 151. The pool 160 is more than one such content element, but smaller than the entire collection of content elements on the mass storage 130.

The processor 110 and memory 120 are disposed to be able to deliver substantially all the content elements in the pool 160 simultaneously and substantially in real time.

In alternative embodiments, the pool 160 can be maintained on the mass storage 130 in addition to or instead of in the memory 120. The pool 160 is limited only by the ability of the system 100 to retrieve and deliver substantially all of the content elements in the pool 160 simultaneously.

In a preferred embodiment, the pool 160 comprises about 30 content elements for each channel. The inventor has found that this is a sufficient large number that, at any particular time, virtually every individual recipient 151 will have at least one content element they will enjoy. The inventor has also found that this is a sufficiently small number that the processor 110 and memory 120 are not substantially taxed by attempting to deliver all content elements in the pool 160 simultaneously.

In alternative embodiments, the number of content elements in the pool 160 could be different. The number of content elements in the pool 160 may be selected in response to various a factors, in addition to or instead of the factors noted above.

The number may be adaptive to the predicted composition of the community 150, which itself may be responsive to the time of day or day of the week.

The number may be adaptive to requests from individual recipients 151 or to ratings from individual recipients 151.

The number may be adaptive to the size or type of content elements in the pool 160. For example, one video element might require substantially more resources to deliver than one audio element, and thus might be considered to occupy a larger proportion of the pool 160.

The number may be adaptive to priorities assigned to content elements in the pool 160, or to other administrative requirements.

The content elements in the pool 160 are replaced from time to time; thus, the pool 160 does not comprise the same content elements at all times.

In a preferred embodiment, each content element in the pool 160 has a known play length, which is the amount of time it takes to play that song in real time. Each song is retained in the pool 160 for its play length (plus any amount of time required to actually distribute the song if it has been selected for distribution to individual recipients 151). After a particular content element is ready for replacement, the processor 110 selects a new content element from the entire set of content elements (for that particular channel) to enter into the pool 160.

In alternative embodiments, the content elements in the pool 160 may be replaced in response to other factors, in addition to or instead of play length:

The entire pool 160 may be selected for replacement en masse, either periodically, in response to some random factor, or in response to some other factor such as feedback from the community 150, Individual content elements in the pool 160 may be selected for replacement earlier or later than their play length, in response to some random factor, in response to feedback from the community 150, or in response to failure to be selected for distribution.

Personalized Distribution

For each individual recipient 151 requesting personalized distribution, there are times when a content element is selected for personalized distribution to that individual recipient 151. At those times, the content element is selected from the pool 160. After examining at least one such content element, the processor 110 selects one content element for distribution to that individual recipient 151. After that one content element is distributed to that individual recipient 151 (and if the individual recipient 151 still desires personalized distribution) the processor 110 continues to examine content elements in the pool 160 and select them for distribution to that individual recipient 151.

In a preferred embodiment, the processor 110 selects content elements for personalized distribution at times responsive to each individual recipient 151, such as when an individual recipient 151 specifically requests distribution of a content element, or when a previous content element ends, or triggered by a timer or other event.

In alternative embodiments, the processor 110 may select content elements for personalized distribution at times responsive to sets of individual recipients 151, such as when content elements are scheduled for multicast to a plurality of individual recipients 151. In such alternative embodiments, the processor 110 may give preference to those content elements scheduled for multicast. The preference may be expressed, for example, by adjusting the score of content elements responsive to that schedule or by restricting the selection for personalized distribution to those content elements.

The processor 110 selects a first content element from the pool 160, and determines a predicted interest by the individual recipient 151 in that first content element.

In a preferred embodiment, the first content element is selected from the pool in a weighted round robin manner. In alternative embodiments, the first content element may be selected in response to another technique, such as at random.

In a preferred embodiment, the processor 110 determines the predicted interest in response to a set of known correlation factors between the particular individual recipient 151 and other known groups of individual recipients 151 in the community 150. The processor 110 preferably uses a known CF (collaborative filtering) technique. CF techniques are known in the art of predicting audience response.

In alternative embodiments, where determining a predicted interest is relatively less resource-intensive, the processor 110 may make the determination using other techniques. For example, the processor 110 may make the determination for a larger number of content elements in the pool 160 (even for all of them). The processor 110 may make the determination for content elements not already in the pool 160 (for possible addition to the pool 160).

The processor 110 compares the predicted interest with a minimum interest threshold, to determine whether the first content element will probably be liked or disliked by the particular individual recipient 151.

In a preferred embodiment, both the predicted interest and the interest threshold are compared using dimensionless units. In this application these units are referred to as being on a scale of zero (worst) to ten (best). However, there is no special reason for the scale to have this particular granularity or these particular endpoint values.

In a preferred embodiment, the minimum interest threshold is initially set relatively high, to maximize the probability that the individual recipient 151 will like the song. For example, the initial minimum interest threshold is preferably set to about nine (on a scale of zero to ten).

The processor 110 also compares the first content element with a set of business rules, to determine whether distribution of the first content element will be disallowed for administrative reasons. Business rules have three possible types:

Legal restrictions imposed on distributing content elements, such as by licensing requirements. For example, the license for distributing songs can sometimes require that a particular song not be played more than twice in one hour, or that a particular artist's songs not be played more than three times in one hour.

Marketing restrictions imposed on distributing content elements, such as by perceived desires or needs of the community 150. For example, marketing considerations can dictate that a particular song not be played twice in a row, or that particular artist's songs not be played more than three times in a row, or that a "downbeat" song not be followed immediately by an "upbeat" song.

Other administrative, financial, or technical restrictions. For example, administrative considerations can dictate, that song play cannot run over scheduled commercial breaks or station identification.

If the processor 110 determines that the content element meets the minimum interest threshold and the business rules, it distributes the content element tot the individual recipient 151.

If the processor 110 determines that the content element should not be distributed for either reason, it selects a second content element from the pool 160 and repeats the examination with regard to that second content element.

For each successive content element it examines, the processor 110 adjusts the minimum interest threshold downward. The processor 110 compares each of the content elements it has examined against the adjusted minimum interest threshold, and selects the best one.

Thus, if the first content element does not meet the relatively high initial threshold, both the first and second content elements are compared against a somewhat relaxed threshold. If both the first and second content elements do not meet the relaxed the relaxed threshold, a third content element is selected and all of the first, second, and third content elements are compared against a further relaxed threshold. This process is repeated until one of the following:

at least one content element meets a sufficiently relaxed threshold (and satisfies the business rules); or the processor 110 has examined a selected maximum number of content elements (possibly the entire pool 160).

In either case, the processor 110 distributes one content element it has examined that has the best predicted interest (and satisfies the business rules).

In a preferred embodiment, the minimum interest threshold is adjusted downward by multiplying the previous minimum interest threshold by a factor smaller than one. For example, this factor is preferably about 0.9.

In a preferred embodiment, the maximum number of content elements examined by the processor 110 is about half the size of the pool 160. For example, this number is preferably about 15.

In alternative embodiments, any of the values used for this process may be adaptively selected in response to a variety of factors:

The initial value for the minimum interest threshold can be adaptively selected in response to one or more of (1) the average predicted interest of all content elements in the pool 160 for the entire community 150, (2) the average expressed interest by the individual recipient 151 for content elements distributed to that individual recipient 151 in the past, (3) a measure of relative load on the processor 110, or other known factors.

The factor for reducing the minimum interest threshold, or the technique for adjusting the minimum interest threshold, can be adaptively selected in response to one or more of the factors noted above.

The maximum number of content elements examined by the processor, can be adaptively selected in response to one or more of the factors noted above.

In a preferred embodiment, the processor 110 selects content elements for personalized distribution separately for each channel.

In alternative embodiments, the individual recipient 151 can select a plurality of channels from which the processor 110 selects content elements for personalized distribution. In such alternative embodiments, the processor 110 can select content elements from a union of pools 160 for each channel, or using some other technique.

Method of Operation

Figure 2:
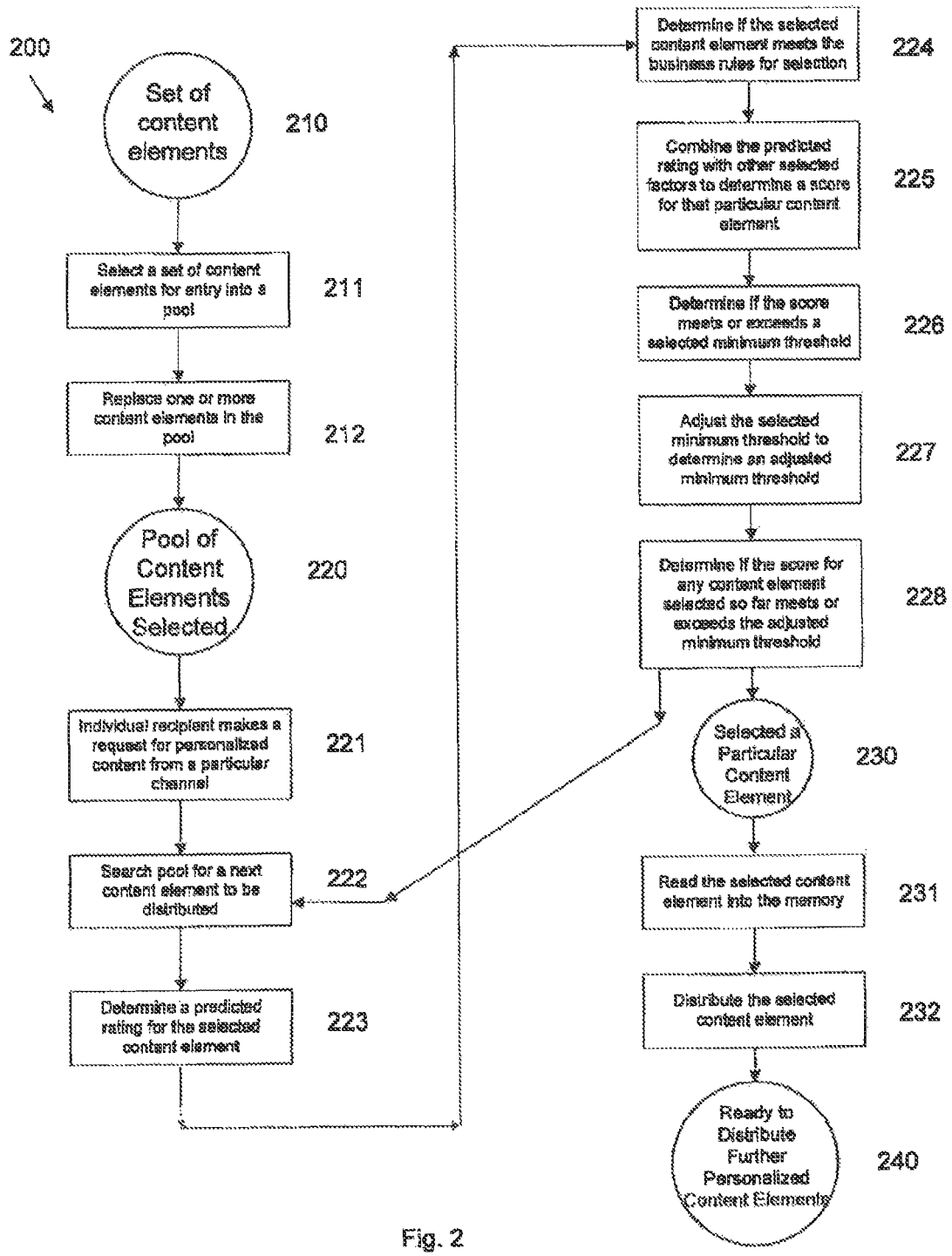
FIG. 2 shows a flow diagram of a method for distributing personalized content.

FIG. 2 shows a flow diagram of a method for distributing personalized content.

A method 200 is performed by the system 100, including the processor 110, memory 120, mass storage 130, and communication path 140.

Pool Selection

At a flow point 210, the system 100 has a set of content elements for distribution to the community 150.

At a step 211, the processor 110 selects a set of content elements for entry into the pool 160. As noted herein, the number of elements in the pool 160 is preferably about 30, but may be different and may be adaptive in response to factors noted herein.

At a step 212, the processor 110 periodically replaces one or more content elements in the pool 160. As noted herein, the processor 110 preferably replaces each content element in the pool 160 after the duration of its play length. At that time, the processor 110 retains ejected content elements in the memory 120 if they are then currently being distributed, but marks them as ineligible for selection for personalized distribution.

In alternative embodiments, at the step 212, the processor 110 may periodically replace all of the content elements in the pool 160. For example, the processor 110 may perform this to step periodically about every 30 seconds.

If the system 100 is reset for any reason, such as by a system failure or a reset forced by an operator, the method 200 returns to the flow point 210 and the processor 110 selects a new pool 160.

Content Element Selection

At a flow point 220, the system 100 has selected the pool 160 of content elements for personalized distribution to individual recipients 151 in the community 150.

At a step 221, an individual recipient 151 makes a request for personalized content from a particular channel (or as noted above, from a particular set of channels). The processor 110 receives the request and the method 200 proceeds with the next step.

At a step 222, the processor 110 searches the pool 160 for a next content element to be distributed. As noted herein, the particular method for search is preferably a weighted round robin technique, but there is no particular reason in the context of this invention for using any particular search technique.

At a step 223, the processor 110 determines a predicted rating for the selected content element. As noted herein, the processor 110 preferably uses a known CF technique.

At a step 224, the processor 110 determines if the selected content element meets the business rules for selection.

At a step 225, the processor 110 combines the predicted rating with other selected factors to determine a score for that particular content element.

In a preferred embodiment, violating any of the business rules bars distribution of the content element, so the processor 110 assigns the content element the lowest possible score (zero).

In alternative embodiments, violating licensing restrictions has the same effect, but violating marketing or administrative restrictions may have a less drastic effect. For example, the processor 110 can significantly reduce the score of the content element, but not reduce it to zero, for violating selected "soft" marketing business rules.

At a step 226, the processor 110 determines if the score meets or exceeds a selected minimum threshold for the individual recipient 151. As noted above, the initial value for the minimum threshold is about nine (on a scale of zero to ten), but may be different or may be adaptive responsive to a variety of factors.

If the score for the selected content element meets or exceeds the selected minimum threshold, the method 200 proceeds with the flow point 230, and the content element is distributed to the individual recipient 151.

If the score for the selected content element does not meet the selected minimum threshold, the method 200 proceeds with the next step.

At a step 227, the processor 110 adjusts the selected minimum threshold to determine an adjusted minimum threshold. As noted above, the processor 110 preferably multiplies the selected minimum threshold by a factor less than one, such as 0.9, but in alternative embodiments the factor may be different or may be adaptive in response to various factors.

At a step 228, the processor 110 determines if the score for any content element selected so far meets or exceeds the adjusted minimum threshold.

If one or more content elements selected so far meet or exceed the adjusted minimum threshold, the processor 110 selects the content element with the highest score. The method 200 proceeds with the flow point 230, and that content element is distributed to the individual recipient 151.

If none of the content elements selected so far meet or exceed the adjusted threshold, the method 200 returns to the step 222, and a next content element is selected.

As noted herein, the method 200 returns to the step 222 only a selected maximum number of times. In a preferred embodiment, this selected maximum number is about 15. In alternative embodiments, this selected maximum number may be different or may be adaptive in response to so various factors.

If the selected maximum number of returns to the step 222 would be exceeded, the processor 110 selects the content element with the highest score, similarly to the case when that score did meet or exceed the adjusted minimum threshold. Similarly, the method 200 proceeds with the flow point 230, and that content element is distributed to the individual recipient 151.

Content Element Distribution

At a flow point 230, the system 100 has selected a particular content element for distribution to the individual recipient 151.

At a step 231, the processor 110 reads the selected content element into the memory 120 from the mass storage 130 (if the selected content element is not already in the memory 120).

At a step 232, the processor 110 distributes the selected content element from the memory 120, using the communication path 140, to the individual recipient 151.

At a flow point 240, the system 100 has distributed the selected content element to the individual recipient 151, and is ready to distribute further personalized content elements. The method 200 proceeds with the flow point 230.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A computer-implemented method, comprising:
calculating (i) a first value indicative of an interest of a first user with respect to a first digital media item and (ii) a second value indicative of an interest of the first user with respect to a second digital media item;
determining, using at least one processor, whether the first value exceeds an initial threshold level of interest associated with the first user;
computing a modified threshold level of interest for the first user, when the first value fails to exceed the initial threshold level;
determining, using the at least one processor, whether the second value exceeds the modified threshold level;
when the second value exceeds the modified threshold level, determining, using the at least one processor, whether the second digital media item satisfies an administrative rule, the administrative rule comprising at least one of a legal restriction, a marketing restriction, a financial restriction, or a technical restriction; and generating an instruction to provide information identifying the second digital media item to the first user, when the second digital media item satisfies the administrative rule.

2. The method of claim 1, further comprising:
obtaining information identifying a pool of digital media items of potential interest to the first user, the pool of digital media items comprising the first and second digital media items.

3. The method of claim 2, wherein the pool of digital media items is associated with a media channel accessible to the first user.

4. The method of claim 2, further comprising:
selecting at least one of the first or second digital media items from the pool using a weighted round-robin algorithm.

5. The method of claim 1, wherein the calculating comprises:
obtaining information identifying a correlation factor between the first user and at least one additional user; and
calculating at least one of the first value or the second value based on the correlation factor.

6. The method of claim 1, wherein the computing comprises computing the modified threshold level as a product of the initial threshold level and a factor having a value less than unity.

7. The method of claim 1, further comprising:
determining the initial threshold level based on at least one of (i) an initial threshold level of interest associated with at least one additional user, or (ii) an interest expressed by the first user in one or more previously-provided digital media items.

8. The method of claim 1, further comprising:
determining, when the first value exceeds the initial threshold level, whether the first digital media item satisfies an administrative rule, the administrative rule comprising at least one of a legal restriction, a marketing restriction, a financial restriction, or a technical restriction; and
generating an instruction to provide the information identifying the first digital media item to the first user, when the first digital media item satisfies the administrative rule.

9. An apparatus, comprising:
a storage device that stores a set of instructions; and
at least one processor coupled to the storage device, the at least one processor being configured to execute the instructions stored in the storage device to:
calculate (i) a first value indicative of an interest of a first user with respect to a first digital media item and (ii) a second value indicative of an interest of the first user with respect to a second digital media item;
determine whether the first value exceeds an initial threshold level of interest associated with the first user;
compute a modified threshold level of interest for the first user, when the first value fails to exceed the initial threshold level;
determine whether the second value exceeds the modified threshold level;
when the second value exceeds the modified threshold level, determine whether the second digital media item satisfies an administrative rule, the administrative rule comprising at least one of a legal restriction, a marketing restriction, a financial restriction, or a technical restriction; and
generate an instruction to provide information identifying the second digital media item to the first user, when the second digital media item satisfies the administrative rule.

10. The apparatus of claim 9, wherein the at least one processor is further configured to execute the instructions to:
obtain information identifying a pool of digital media items of potential interest to the first user, wherein:
the pool of digital media items comprises the first and second digital media items; and
the pool of digital media items is associated with a media channel accessible to the first user.

11. The apparatus of claim 9, wherein the at least one processor is further configured to execute the instructions to:
select at least one of the first or second digital media items from the pool using a weighted round-robin algorithm.

12. The apparatus of claim 9, wherein the at least one processor is further configured to execute the instructions to:
obtain information identifying a correlation factor between the first user and at least one additional user; and
calculate at least one of the first value or the second value based on the correlation factor.

13. The apparatus of claim 9, wherein the at least one processor is further configured to execute the instructions to:
compute the modified threshold level as a product of the initial threshold level and a factor having a value less than unity.

14. The apparatus of claim 9, wherein the at least one processor is further configured to execute the instructions to:
determine the initial threshold level based on at least one of (i) an initial threshold level of interest associated with at least one additional user or (ii) interest expressed by the first user in one or more previously-provided digital media items.

15. The apparatus of claim 9, wherein the at least one processor is further configured to execute the instructions to:
determine, when the first value exceeds the initial threshold level, whether the first digital media item satisfies an administrative rule, the administrative rule comprising at least one of a legal restriction, a marketing restriction, a financial restriction, or a technical restriction; and
generate an instruction to provide the information identifying the first digital media item to the first user, when the first digital media item satisfies the administrative rule.

16. A tangible, non-transitory computer-readable medium storing instructions that, when executed by at least one processor, cause the at least one processor to perform a method, comprising:
calculating (i) a first value indicative of an interest of a first user with respect to a first digital media item and (ii) a second value indicative of an interest of the first user with respect to a second digital media item;
determining whether the first value exceeds an initial threshold level of interest associated with the first user;
computing a modified threshold level of interest for the first user, when the first value fails to exceed the initial threshold level;
determining whether the second value exceeds the modified threshold level;
when the second value exceeds the modified threshold level, determining whether the second digital media item satisfies an administrative rule, the administrative rule comprising at least one of a legal restriction, a marketing restriction, a financial restriction, or a technical restriction; and generating an instruction to provide information identifying the second digital media item to the first user, when the second digital media item satisfies the administrative rule.

17. The method of claim 1, wherein:

the marketing restriction specifies a relationship between at least one characteristic of the second digital media item and corresponding characteristics of one or more digital media items previously presented to the first user; and determining whether the second digital media item satisfies the administrative rule comprises determining whether the at least one characteristic of the second digital media item satisfies the specified relationship.

18. The method of claim 1, wherein:

the legal restriction specifies a limitation on a playback of the second digital media item during a predetermined time period; and determining whether the second digital media item satisfies the administrative rule comprises determining whether the provision of the second digital media item information to the first user satisfies the specified limitation.

19. The apparatus of claim 9, wherein:

the marketing restriction specifies a relationship between at least one characteristic of the second digital media item and corresponding characteristics of one or more digital media items previously presented to the first user; and the at least one processor is further configured to execute the instructions to determine whether the at least one characteristic of the second digital media item satisfies the specified relationship.

20. The apparatus of claim 9, wherein:

the legal restriction specifies a limitation on a playback of the second digital media item during a predetermined time period; and the at least one processor is further configured to execute the instructions to determine whether the provision of the second digital media item information to the first user satisfies the specified limitation.

* * * * *